United States Patent
Hofschneider

(10) Patent No.: US 6,669,421 B2
(45) Date of Patent: Dec. 30, 2003

(54) CONNECTING ELEMENT WITH ECCENTRIC DISKS

(75) Inventor: Manfred Hofschneider, Wuppertal (DE)

(73) Assignee: Altenloh, Brinck & Co. GmbH & Co., Ennepetal (DE)

( * ) Notice: Subject to any disclaimer, the term of this patent is extended or adjusted under 35 U.S.C. 154(b) by 0 days.

(21) Appl. No.: 10/088,158

(22) PCT Filed: Jun. 27, 2001

(86) PCT No.: PCT/EP01/07339

§ 371 (c)(1),
(2), (4) Date: Jun. 4, 2002

(87) PCT Pub. No.: WO02/06687

PCT Pub. Date:Jan. 24, 2002

(65) Prior Publication Data

US 2002/0164226 A1 Nov. 7, 2002

(30) Foreign Application Priority Data

Jul. 13, 2000 (DE) ..................... 200 12 108 U

(51) Int. Cl.⁷ ........................... F16B 19/00; F16B 43/02
(52) U.S. Cl. .................... 411/354; 411/368; 411/371.2; 411/539
(58) Field of Search ................................. 411/354, 368, 411/371.2, 537, 539

(56) References Cited

U.S. PATENT DOCUMENTS

| | | | | |
|---|---|---|---|---|
| 3,041,913 A | * | 7/1962 | Liska | 411/539 X |
| 5,580,201 A | * | 12/1996 | Brilmyer | 411/354 |
| 5,779,260 A | * | 7/1998 | Reilly et al. | 411/539 X |
| 6,409,189 B1 | * | 6/2002 | Orimoto et al. | 411/539 X |

FOREIGN PATENT DOCUMENTS

| | | |
|---|---|---|
| DE | 283167 | 9/1952 |
| FR | 2720845 | 12/1995 |
| JP | 59030433 | 2/1984 |

* cited by examiner

*Primary Examiner*—Neill Wilson
(74) *Attorney, Agent, or Firm*—Brinks Hofer Gilson & Lione

(57) ABSTRACT

The present invention relates to a connecting element which comprises a bolt element with a head and a shank adjoining the latter. The head is formed from a means of engagement for a tool, which is arranged concentrically in relation to a longitudinal bolt axis, and a first eccentric disk, which is arranged eccentrically in relation to the longitudinal bolt axis. At least one second eccentric disk (22), which has a circumferential punching burr, can be pushed onto the shank by way of an eccentrically arranged push-on opening (24). According to the invention, the shank and the second eccentric disk can only be pushed onto the shank in the correct position, such that the circumferential punching burr is oriented away from the head.

9 Claims, 3 Drawing Sheets

CONNECTING ELEMENT WITH ECCENTRIC DISKS

FIELD OF THE INVENTION

The present invention relates to a connecting element comprising a bolt element with a head and a shank adjoining the latter, the head being formed from a means of engagement for a tool, which is arranged concentrically in relation to a longitudinal bolt axis, and a first eccentric disk, which is arranged eccentrically in relation to the longitudinal bolt axis, and at least one second eccentric disk, which has a circumferential punching burr, can be pushed onto the shank by way of an eccentrically arranged push-on opening.

BACKGROUND OF THE INVENTION

Such connecting elements serve for connecting, for example, two components to one another and aligning them relative to one another. In this case, connecting elements of the generic type have, on the shank, a threaded section onto which a nut can be screwed. The two eccentric disks fit in recesses of the two components, it being possible for the connection to be fixed via the screw-on nut. Rotation of the head then results in the components being changed in position via the eccentric disks.

The eccentric disk which can be pushed onto the shank is usually a punched element. The punching operation produces an edge which, on one side, is of rounded form and, on its other side, has a punching burr projecting in the punching direction. In the case of abutment in the recess, this punching burr often results in damage to the component. In order to prevent such damage during assembly, it is customary to deburr the eccentric disk prior to assembly, this involving much effort and corresponding costs.

A further disadvantage with connecting elements of the generic type is that the usually necessary operation of aligning the two eccentric disks in position in relation to one another during assembly is relatively time-consuming.

BRIEF SUMMARY OF THE INVENTION

The object of the present invention is to provide a connecting element of the generic type which can be produced without deburring and, nevertheless, allows easy and quick assembly such that the punching burr present is not problematic.

This is achieved according to the invention in that the shank and the second eccentric disk have such a coding that the second eccentric disk can only be pushed onto the shank in the correct position, such that the circumferential punching burr is oriented away from the head.

Configuring the connecting element according to the invention results in deburring of the second eccentric disk not being necessary since the coding prevents the burr which is produced from coming into abutment against the recess of the component. The arrangement of two guide grooves with the longitudinal axis running in the direction of the longitudinal bolt axis and with different cross sections has proven to be a particularly advantageous coding. The guide grooves interact with noses, which extend into the interior of the eccentrically arranged push-on opening of the second eccentric disk, such that the second eccentric disk can only be pushed onto the shank in the correct position.

In a further embodiment, the coding is provided via just one, cross sectionally non-symmetrical guide groove, in which a correspondingly configured nose can be guided.

The coding according to the invention makes it possible for the correct position of the second eccentric disk to be adjusted not just in relation to the burr present but also in relation to the eccentric disk arranged on the head. For example, it may be necessary for the two eccentric disks to be arranged concurrently in relation to the longitudinal bolt axis.

BRIEF DESCRIPTION OF THE DRAWINGS

Further advantageous embodiments are contained in the subclaims. The invention is explained in more detail with reference to the exemplary embodiment illustrated in the attached drawing, in which:

In the various figures of the drawings, the same parts are always provided with the same designations.

DETAILED DESCRIPTION OF THE INVENTION

Figure 1:
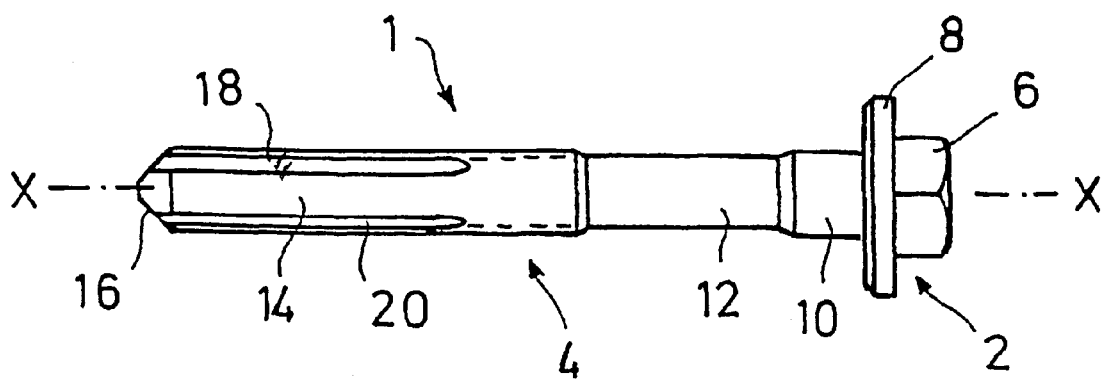
FIG. 1 shows a side view of a connecting element according to the invention.
Figure 2:
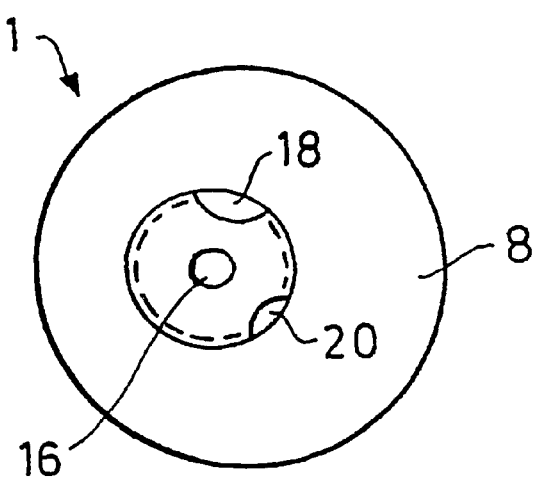
FIG. 2 shows a front view of a connecting element according to the invention.

As can be seen from FIG. 1, a connecting element according to the invention has in particular a bolt 1, a head 2 and an essentially cylindrical shank 4 and a longitudinal bolt axis X-X. The head 2 comprises a means of engagement 6 and a first eccentric disk 8, which is arranged eccentrically in relation to the longitudinal axis X-X. In the exemplary embodiment illustrated, the shank 4 is subdivided into three sections 10, 12, 14. It begins, following the first eccentric disk 8, with a guide section 10, which merges into a central section 12 which has a smaller external diameter than the guide section 10. The central section 12 is adjoined by a threaded section 14 with a tip 16 arranged at its free end. In the advantageous embodiment, the threaded section 14 has a first guide groove 18 and a second guide groove 20, the longitudinal axes of which run parallel to the longitudinal bolt axis X-X. As can be gathered from FIG. 2, the two guide grooves 18, 20 have different cross sections.

Figure 3:
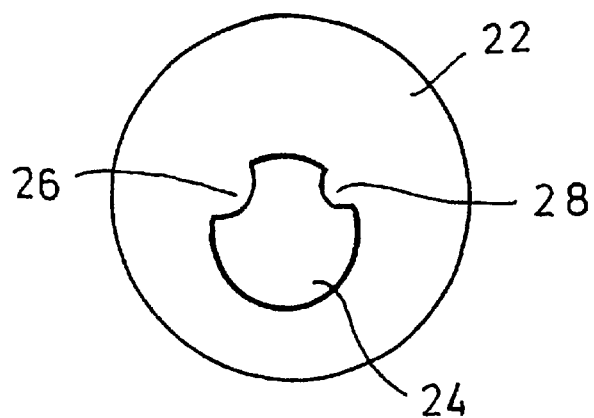
FIG. 3 shows a plan view of a second eccentric disk according to the invention.

FIG. 3 shows a second eccentric disk 22 with an eccentrically arranged push-on opening 24. The push-on opening 24 is dimensioned such that it can be pushed onto the threaded section 14 of the bolt 1. A first nose 26 and a second nose 28 are configured, and arranged in the push-on opening 24, such that they can be guided in the guide grooves 18, 20 of the threaded section 14. In this case, the guide grooves 18, 20 are coordinated with one another such that the second eccentric disk 22 can only be pushed onto the shank 4 in a manner in which it is aligned such that the punching burr produced is not oriented in the direction of the head 2 during assembly and that does not come into abutment with a component (not illustrated). Correspondingly, the first nose 26 has a cross section which is adapted to the cross section of the first guide groove 18, and the second nose 28 has a cross section which is adapted to the cross section of the second guide groove 20. For example, it is possible for the guide grooves 18, 20 and the noses 26, 28 which interact therewith to be of different depths or different widths, but it is also possible for them to have differently shaped groove flanks. It is further possible, by way of the arrangement of the guide grooves 18, 20 and of the noses 26, 28, for the position of the second eccentric disk 22, which is determined by eccentricity, to be coordinated with that of the first eccentric disk 8.

Figure 4:
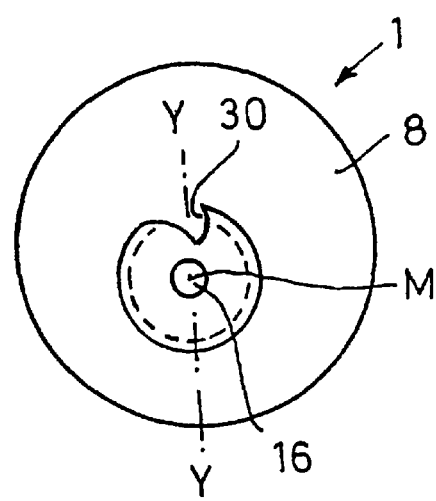
FIG. 4 shows a front view of a second embodiment of a connecting element according to the invention.
Figure 5:
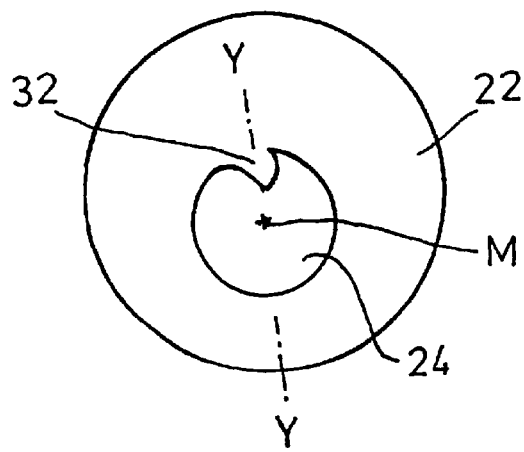
FIG. 5 shows a plan view of a second embodiment of a second eccentric disk according to the invention.

FIGS. 4 and 5 illustrate a second embodiment of a connecting element according to the invention. The coding of the connecting element is provided by just one guide groove 30, in which it is possible to guide a nose 32 which is arranged in the push-on opening 24 of the second eccentric disk 22. The guide groove 30 has, in cross section, a concavely curved groove flank and a convexly curved groove flank, and the flanks of the nose 32 are adapted correspondingly. The cross sections of the guide groove 30 and of the nose 32, these cross sections being non-symmetrical in relation to a center axis Y-Y, running through a center point M, of the guide groove 30 and of the nose 32, likewise ensure that the punching burr produced cannot be fitted in the direction of the head 2. Alternatively, it should also be conceivable for one of the groove flanks to be formed perpendicularly to, and for the other to be formed obliquely in relation to, the longitudinal bolt axis X-X.

Figure 6:
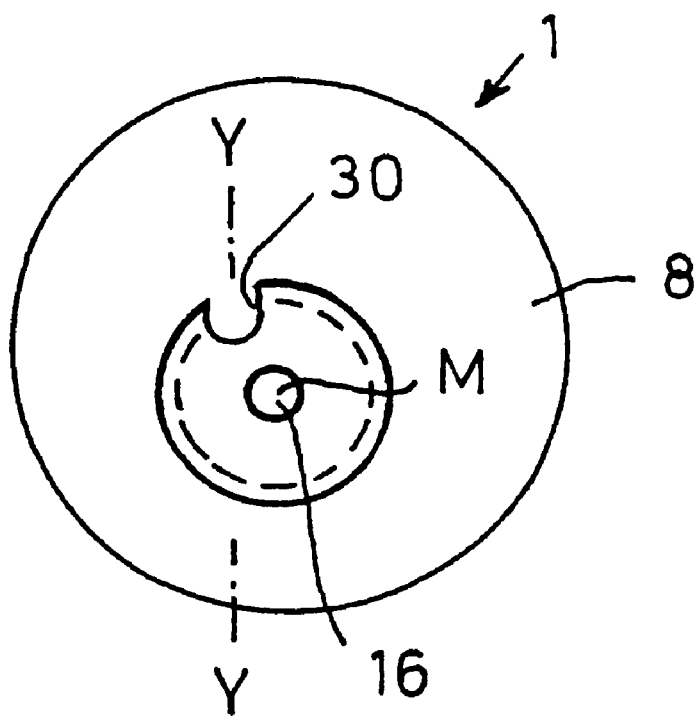
FIG. 6 shows a front view of a third embodiment of a connecting element according to the invention.
Figure 7:
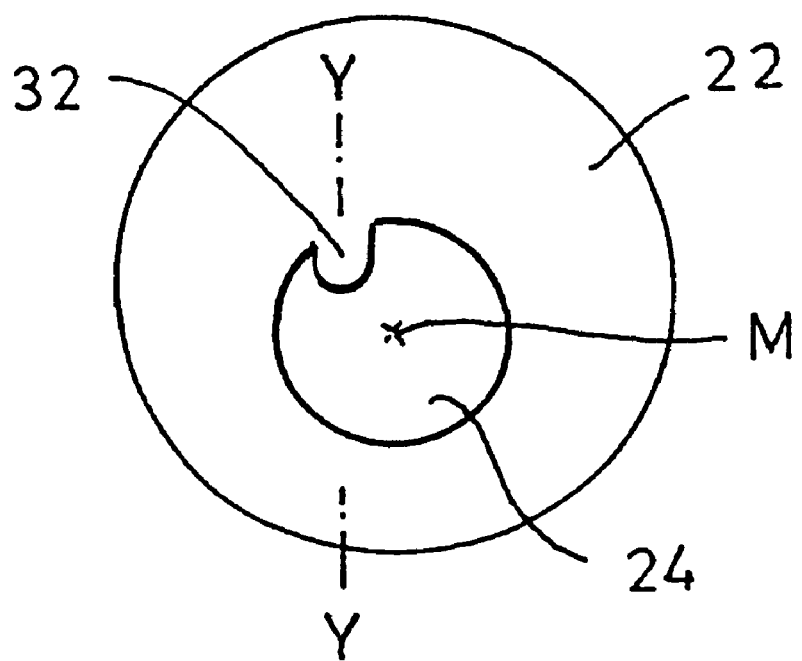
FIG. 7 shows a plan view of a third embodiment of a second eccentric disk according to the invention.

FIGS. 6 and 7 show a further embodiment of a connecting element according to the invention. The coding of the connecting element is likewise provided by just one guide groove 30, in which it is possible to guide a nose 32 which is arranged in the push-on opening 24 of the second eccentric disk 22. The guide groove 30 and the nose 32 have, in cross section, a center axis Y-Y running parallel to a diameter D of the shank 4. This likewise ensures that the second eccentric disk 22 can only be pushed onto the shank 4 in the correct position.

The guide grooves 18, 20, 30 may be produced, for-example, with the aid of disk milling cutters. For producing two guide grooves 18, 20, it is expedient for the disk milling cutters to be arranged in a manner in which they are clamped parallel on a shaft. Deformation is also conceivable in principle.

In addition to their function as coding elements, the guide grooves 18, 20, 30, via the noses 26, 28, 32,transmit the torque of the connecting element to the second eccentric disk 22.

The alignment of the first eccentric disk 8 in relation to the means of engagement 6 is likewise freely selectable. In the assembled state, in the exemplary embodiment illustrated, the second eccentric disk 22 is secured by a nut, which can be screwed onto the threaded section 14 (not illustrated here).

Rather than being restricted t6 the exemplary embodiment illustrated and described, the invention also covers all equivalent configurations within the scope of the invention. Furthermore, rather than being limited to the combination of features defined in claim 1, the invention may also be defined by any other desired combination of specific features of all the individual features disclosed in their entirety. This means that basically more or less any individual feature of claim 1 can be omitted and/or replaced by at least one individual feature disclosed at some other point of the application. To this extent, claim 1 is merely to be understood as being the first trail wording of the invention.

What is claimed is:

1. A connecting element comprising:

a bolt element with a head and a shank adjoining the head, the head comprising a means of engagement for a tool, which is arranged concentrically in relation to a longitudinal bolt axis (X-X), and a first eccentric disk, which is arranged eccentrically in relation to the longitudinal bolt axis (X-X), and at least one second eccentric disk comprising an eccentrically arranged push-on opening and a side having a circumferential punching burr about the push-on opening, wherein the shank and the second eccentric disk are cooperatively sized and shaped to permit the second eccentric disk only to be pushed onto the shank with the side having the circumferential punching burr oriented away from the head.

2. The connecting element of claim 1, wherein the shank comprises at least one guide groove, and the push-on opening of the second eccentric disk comprises a nose guided in the guide groove of the shank.

3. The connecting element of claim 2, wherein the guide groove, which is located in the shank, has a non-symmetrical cross section and the nose is designed non-symmetrically to correspond to the guide groove.

4. The connecting element of claim 2, wherein the guide grooves are produced by milling.

5. The connecting element of claim 2, wherein the guide grooves are produced by material deformation.

6. The connecting element of claim 1, wherein the shank has a threaded section at one end, onto which a nut can be screwed.

7. The connecting element of claim 1, wherein the shank has at least two guide grooves which have different cross sections and interact with two noses projecting into the interior of the push-on opening of the second eccentric disk, it being possible for each nose only to be guided in one of the guide grooves in each case.

8. The connecting element of claim 7, wherein the guide grooves are produced by milling.

9. The connecting element of claim 7, wherein the guide grooves are produced by material deformation.

* * * * *